US010356745B2

(12) United States Patent
Karimli et al.

(10) Patent No.: US 10,356,745 B2
(45) Date of Patent: Jul. 16, 2019

(54) DEVICE AND/OR LINE EVENT AWARENESS AND SMART SYNCHRONIZATION

(71) Applicant: T-Mobile USA, Inc., Bellevue, WA (US)

(72) Inventors: Yasmin Karimli, Kirkland, WA (US); Gunjan Nimbavikar, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 15/247,470

(22) Filed: Aug. 25, 2016

(65) Prior Publication Data
US 2017/0359799 A1 Dec. 14, 2017

Related U.S. Application Data

(60) Provisional application No. 62/347,485, filed on Jun. 8, 2016.

(51) Int. Cl.
H04W 68/00 (2009.01)
H04W 8/18 (2009.01)
(Continued)

(52) U.S. Cl.
CPC .... *H04W 68/005* (2013.01); *G06F 16/24564* (2019.01); *G06F 16/285* (2019.01);
(Continued)

(58) Field of Classification Search
CPC .............................. H04W 4/06; H04W 72/005
See application file for complete search history.

(56) References Cited

U.S. PATENT DOCUMENTS 7,711,002 B2 5/2010 Mukherjee et al.
9,723,121 B2 8/2017 Lam et al.
(Continued)

FOREIGN PATENT DOCUMENTS

EP 2590376 5/2013
KR 101475006 12/2014
WO WO2013109034 7/2013

OTHER PUBLICATIONS

Office action for U.S. Appl. No. 15/063,749, dated Feb. 8, 2017, Karimli et al., "Content Sharing Between Related Devices", 16 pages.
(Continued)

*Primary Examiner* — Liton Miah
(74) *Attorney, Agent, or Firm* — Lee & Hayes, P.C.

(57) ABSTRACT

Device and/or line event awareness and smart synchronization is described. In at least one example, a related device of a group of related devices may receive a communication notification representative of a communication event. Such communication notifications may enable event awareness for each of the devices in the group of related devices. In an example, the related device may compare data items (e.g., participants, timestamps, etc.) associated with the communication notification with data items associated with entries stored in a local data store. The entries may correspond to communication events associated with at least the related device. Based at least in part on comparing the data items, the related device may determine whether a new entry associated with the communication notification should be added to a local data store or the communication notification should be disregarded as a duplication.

20 Claims, 8 Drawing Sheets

(51) Int. Cl.

| | | |
|---|---|---|
| *H04W 8/26* | (2009.01) | |
| *H04W 4/14* | (2009.01) | |
| *G06F 16/28* | (2019.01) | |
| *G06F 16/2455* | (2019.01) | |
| *H04L 29/06* | (2006.01) | |
| *H04L 29/08* | (2006.01) | |
| *H04W 56/00* | (2009.01) | |
| *G06K 9/72* | (2006.01) | |

(52) U.S. Cl.
CPC .......... *H04L 65/1006* (2013.01); *H04L 67/24* (2013.01); *H04W 4/14* (2013.01); *H04W 8/186* (2013.01); *H04W 56/002* (2013.01); *G06K 9/72* (2013.01); *H04L 65/1016* (2013.01); *H04W 8/26* (2013.01)

(56) References Cited

U.S. PATENT DOCUMENTS

| | | | |
|---|---|---|---|
| 9,854,010 B2* | 12/2017 | Raghavan | H04L 65/1069 |
| 2007/0133455 A1 | 6/2007 | Kuchibhotla et al. | |
| 2008/0032703 A1* | 2/2008 | Krumm | H04W 4/02 |
| | | | 455/456.1 |
| 2008/0037752 A1 | 2/2008 | Chatilov et al. | |
| 2009/0119590 A1* | 5/2009 | Kondziela | G06F 8/38 |
| | | | 715/716 |
| 2009/0128335 A1 | 5/2009 | Leung | |
| 2009/0164645 A1 | 6/2009 | Sylvain | |
| 2010/0159871 A1* | 6/2010 | Tester | H04W 4/029 |
| | | | 455/404.2 |
| 2010/0304724 A1 | 12/2010 | Lawler et al. | |
| 2012/0317162 A1* | 12/2012 | Endsley | H04L 67/06 |
| | | | 709/201 |
| 2013/0091298 A1 | 4/2013 | Ozzie et al. | |
| 2013/0184027 A1 | 7/2013 | Becker et al. | |
| 2013/0304694 A1* | 11/2013 | Barreto | G06F 17/30283 |
| | | | 707/608 |
| 2014/0149512 A1 | 5/2014 | Leitch | |
| 2014/0280562 A1 | 9/2014 | Shields | |
| 2015/0009818 A1 | 1/2015 | Xiao et al. | |
| 2015/0095420 A1 | 4/2015 | Haun et al. | |
| 2015/0208217 A1 | 7/2015 | Hong et al. | |
| 2015/0215233 A1 | 7/2015 | Lee | |
| 2015/0341288 A1 | 11/2015 | Dandison et al. | |
| 2015/0350124 A1 | 12/2015 | Lee et al. | |
| 2016/0036881 A1 | 2/2016 | Tembey et al. | |
| 2016/0044279 A1 | 2/2016 | Block et al. | |
| 2016/0050263 A1 | 2/2016 | Hwang et al. | |
| 2016/0150063 A1 | 5/2016 | Choi et al. | |
| 2016/0150537 A1 | 5/2016 | Jung et al. | |
| 2016/0162252 A1 | 6/2016 | Di Censo et al. | |
| 2016/0164810 A1* | 6/2016 | Wolz | H04L 51/046 |
| | | | 709/206 |
| 2017/0264652 A1 | 9/2017 | Karimli et al. | |
| 2017/0264742 A1 | 9/2017 | Karimli et al. | |

OTHER PUBLICATIONS

Office action for U.S. Appl. No. 15/063,749, dated Aug. 29, 2016, Karimli et al., "Content Sharing Between Related Devices", 17 pages.

Office action for U.S. Appl. No. 15/063,749, dated Jul. 11, 2017, Karimli et al., "Content Sharing Between Related Devices ", 18 pages.

The PCT Search Report dated Oct. 24, 2017 for PCT application No. PCT/US17/040464, 14 pages.

PCT Search Report and Written Opinion dated Jun. 9, 2017 for PCT Application No. PCT/US17/19714, 12 pages.

PCT Search Report and Written Opinion dated Sep. 12, 2017 for PCT Application No. PCT/US17/35768, 9 pages.

Office Action for U.S. Appl. No. 15/063,749, dated Dec. 11, 2017, Karimli, "Content Sharing Between Related Devices", 18 pages.

Office Action for U.S. Appl. No. 15/212,760, dated Dec. 15, 2017, Karimli, "Cross-Platform Video Conversation Between Related Devices", 22 pages.

Office Action for U.S. Appl. No. 15/212,760, dated Jul. 31, 2018 Karimli, "Cross-Platform Video Conversation Between Related Devices", 19 pages.

Office Action for U.S. Appl. No. 15/063,749, dated Jul. 11, 2018, Karimli, "Content Sharing Between Related Devices", 19 pages.

\* cited by examiner

DEVICE AND/OR LINE EVENT AWARENESS AND SMART SYNCHRONIZATION

PRIORITY APPLICATION

This application claims priority to U.S. Provisional Application No. 62/347,485, filed Jun. 8, 2016 and entitled "Device and/or Line Event Awareness and Smart Synchronization," the entire contents of which are incorporated herein by reference.

BACKGROUND

Users have multiple telecommunication devices such as cellular phones, tablet computers, laptops, and other devices. Each device may have its own communication address, such as a telephone number, and may receive communications directed to any communication address associated with a service account.

In IP Multimedia Subsystem (IMS), call forking may be achieved through implicit registration sets (IRS). With IRS, when any one network identity (e.g., IP Multimedia Public Identifier (IMPU)) associated with a communication address is registered, other network identities associated with a same service account as that network identity are also registered. When a communication is received and directed to any one network identity of the registration set, it may be sent to all network identities of that registration set.

Session Initiation Protocol (SIP), as extended by RFC 3265 ("Session Initiation Protocol (SIP)-Specific Communication Notification," June 2002), utilizes a subscribe method to request a current state as well as state updates from a remote node. The specification for Open Mobile Alliance (OMA) Presence SIMPLE (SIP for Instant Messaging and Presence Leveraging Extensions) defines mechanisms for utilizing SIP to perform instant messaging and other functions. Rich Communication Services (RCS) is a GSM Association (GSMA) program that provides for interoperability within an IP Multimedia Subsystem (IMS). One feature of RCS is the ability to discover capabilities of contacts. RCS utilizes OMA Presence SIMPLE for various data items, including subscription to a presence server to obtain capability information for a list of contacts.

As described above, when a communication is received and directed to any one network identity of a registration set, it may be sent to all network identities of that registration set. Technologies for understanding what communications are being received by each of the network identities are either not available or are inaccessible. Accordingly, individual network identities associated with the registration set may not be aware of what communications are being received by each of the network identities.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
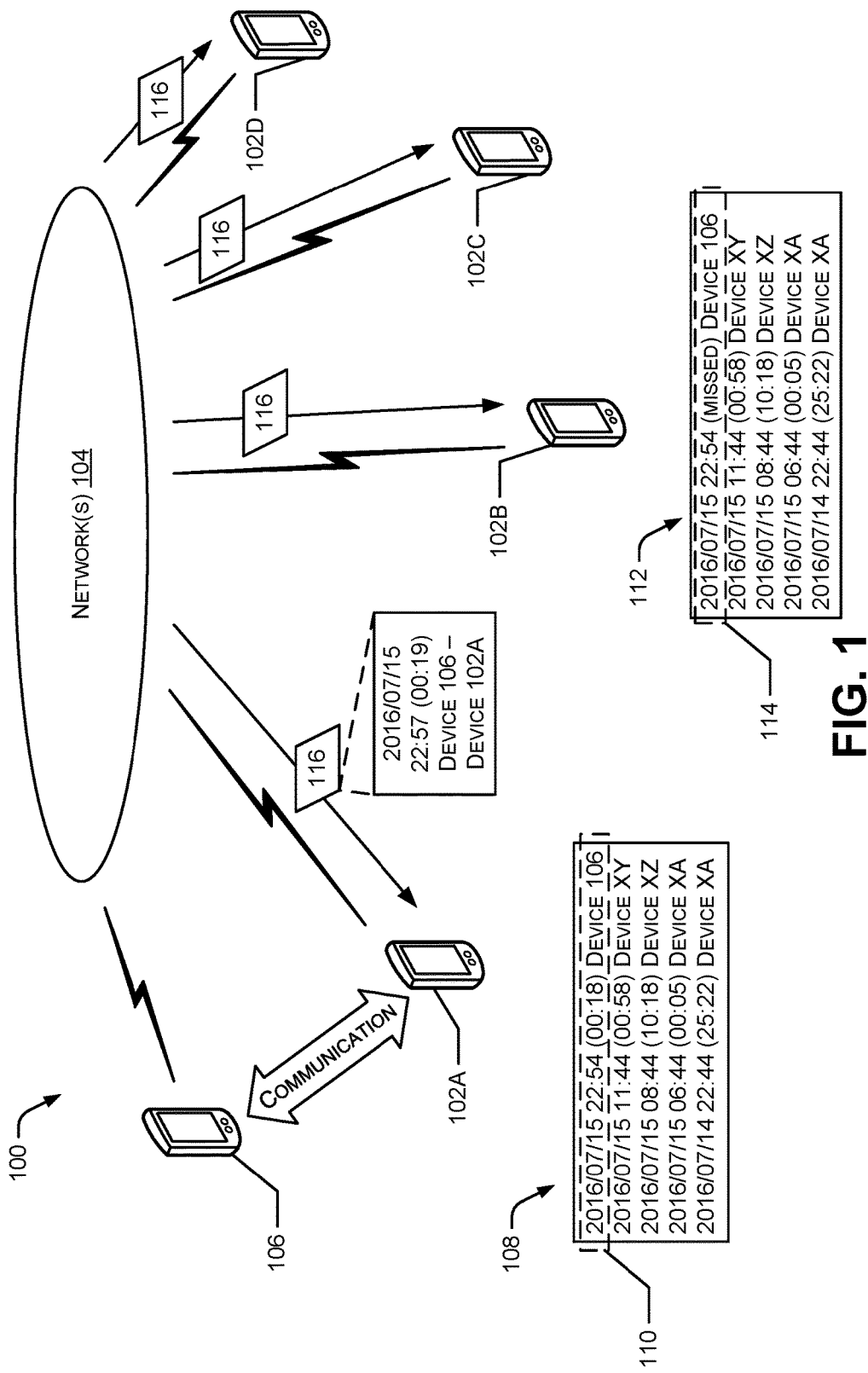
FIG. 1 illustrates an environment for facilitating device and/or line event awareness and smart synchronization.

In examples of the present disclosure, device and/or line event awareness and smart synchronization is described. A group of related devices includes two or more devices that are associated with the same subscriber account, share the same cellular telephone line, and so forth. Devices sharing the same subscriber account are often associated with an international mobile subscriber identity (IMSI). Devices sharing the same telephone line are configured to send, receive, and initiate, cellular communications using a shared identifier, communications address, and so forth, such as a telephone number, Mobile Station International Subscriber Directory Number (MSISDN), IP Multimedia Public Identifiers (IMPU), and so forth. Thus, devices are related in some examples based on their being associated with the same "account" (e.g., associated with an IMSI), associated with the same "line" (e.g., associated with the same communication address), and so forth. That is, for the purpose of this discussion, devices that are associated with a same account and/or a same line may be referred to as related devices. In some examples, related devices include devices for which incoming calls and messages sent to the common communication address may be sent to all of the related devices.

As described above, device and/or line event awareness and smart synchronization is described. In at least one example, a related device of a group of related devices may receive a communication notification representative of a communication event associated with at least one related device of the group of related devices. Such communication notifications may enable event awareness for each of the devices in the group of related devices. For the purpose of this discussion, a communication may correspond to a call (e.g., voice call, video call, etc.), a message (e.g., short message service (SMS), multimedia messaging service (MMS), etc.), etc. A communication event may correspond to an occurrence of a communication. In at least one example, a communication notification representative of a communication event may include data items (e.g., participants, timestamps, etc.) associated with the communication event.

In at least one example, a related device may compare data items associated with a communication notification with data items associated with entries stored in a local data store associated with the related device. In at least one example, a data store associated with a related device may log communications initiated, received, missed, etc. by at least the related device and, in some examples, all of the related devices of a group of related devices. For the purpose of this discussion, a data store on a related device may be referred to as a local activity database. Each entry in the local activity database may correspond to a communication event associated with at least the related device or, in some examples, any of the related devices of the group of related devices. Each entry may be associated with data items (e.g., participants, timestamps, etc.) associated with the communication event. Based at least in part on comparing data items associated with an entry and data items associated with a communication notification, the related device may determine a relationship between the communication event associated with the entry and the communication event associated with the communication notification.

In some examples, the communication notifications used to provide event awareness to the related devices may cause duplications of communication events. That is, in some examples, a related device may have an entry stored in a local activity database that is associated with a communication event and may receive a communication notification corresponding to the same communication event. In at least one example, techniques described herein may enable related devices to avoid duplications of communication events. Additionally and/or alternatively, techniques described herein may enable related devices to avoid missed communication events. For instance, in at least one example, techniques described herein may enable a related device that was previously offline and/or not capable of receiving communication notifications associated with communication events to synchronize a corresponding local activity database with communication events when the related device returns online and/or becomes capable of receiving communication notifications associated with communication events. That is, in at least one example, a related device may receive one or more communication notifications associated with communication events that occurred with one or more other related devices while the related device was offline. The related device may update a respective local activity database to include the communication events that occurred while the related device was offline.

Various examples of the present disclosure are described below in reference to the figures.

FIG. 1 illustrates an environment 100 for facilitating device and/or line event awareness and smart synchronization.

As described above, in at least one example, a communication initiated by an external device may be sent to a contained grouping of related devices (e.g., two or more devices that share an account, line, etc.). That is, each of the related devices in the contained grouping of related devices may receive a communication from an external device and other devices that do not share an account, line, etc. are not permitted to receive the communication. In environment 100, device 102A, device 102B, device 102C, and device 102D are examples of related devices. While four related devices are shown, any number of devices may be related so long as they share at least one of a line or an account with another device.

The related devices (e.g., device 102A, device 102B, device 102C, and device 102D) are each communicatively coupled to network(s) 104. As described herein, network(s) 104 may include a cellular network, the Internet, and/or another network. In at least one example, presence information for the related devices (e.g., device 102A, device 102B, device 102C, and device 102D) may be obtained from a presence server associated with the network(s) 104, such as a SIP server or other. Presence information obtained from the presence server—such as Internet Protocol (IP) addresses or other network address information—may be utilized to establish a connection amongst related devices (e.g., device 102A, device 102B, device 102C, and/or device 102D) to facilitate communications. Presence information obtained from the presence server may be utilized to identify related devices (e.g., device 102A, device 102B, device 102C, and device 102D). For the purpose of this discussion, devices that do not share a line and/or an account with one or more related devices may be referred to as external devices. In environment 100, device 106 is an example of an external device.

As shown in FIG. 1, an external device (e.g., device 106) may send a communication (e.g., make a call, send a message, etc.) to an account or a line associated with a group of related devices (e.g., device 102A, device 102B, device 102C, and device 102D). In at least one example, a related device (e.g., device 102A) of the group of related devices (e.g., device 102A, device 102B, device 102C, and device 102D) may interact with the communication from the external device 106. For instance, a related device (e.g., device 102A) may interact with a communication by answering a call. Or, a related device (e.g., device 102A) may interact with a communication by opening (and presumably reading) a message. A local activity database 108 associated with the related device (e.g., device 102A) may include an entry 110 corresponding to the communication event. The entry 110 may include data items associated with the communication event.

Data items may describe various details associated with a communication event. For example, for a communication event associated with a call, the data items may indicate a date of the call, a start time of the call (i.e., a timestamp associated with when the call was initiated), an end time of the call (i.e., a timestamp associated with when the call was terminated), a duration of the call (i.e., amount of time that lapses between the start time and the end time), at least one other participant associated with the call (e.g., at least one communication addresses or subscriber account associated with the call), a type of the call (e.g., voice, video, etc.), etc. Moreover, for a communication event associated with a message, data items associated with the message may include a date of the message, a send time associated with the message (i.e., a timestamp associated with when the message was sent), a received time associated with the message (i.e., a timestamp associated with when the message was received by the recipient), a read time associated with the message (i.e., a time associated with when the message was opened by the recipient), at least one other participant associated with the message (e.g., at least one communication addresses or subscriber account associated with the message), content of the message (e.g., text, image, video, etc.), a hash or a fingerprint associated with the message (i.e., a string of characters associated with the message by the sender and/or the cellular network that uniquely identifies the message), etc.

In at least one example, the related devices (e.g., device 102B, device 102C, and device 102D) that did not interact with the communication may also add an entry to a corresponding local activity database (e.g., local activity database 112 may correspond to device 102B). In at least one example, the entry may correspond to a missed call, as illustrated by entry 114. In an alternative example, the entry may correspond to an unopened message. In at least one example, the entry 114 may include data items associated with the communication event, as described above, and may include an additional indicator that the communication corresponding to the communication event was not interacted with (e.g., missed or unopened). In at least one example, local activity database (s) associated with each of the other related device(s) (e.g., device 102C and/or device 102D) may include a same entry.

One or more servers associated with the network(s) 104 may log communication events associated external devices 106 and related devices (e.g., device 102A, device 102B, device 102C, and device 102D) in a remote data store (e.g., network activity database) and may provide communication notifications 116 associated with the communication events to enable event awareness for the group of related devices (e.g., device 102A, device 102B, device 102C, and device 102D). In at least one example, responsive to an interaction with the communication (e.g., a call is terminated, a message is opened, etc.), the one or more servers associated with the network(s) 104 may send a communication notification 116 to the group of related devices (e.g., device 102A, device 102B, device 102C, and device 102D). In at least one example, the communication notification 116 may include data items corresponding to the communication event, as described above.

As described herein, techniques enable the related devices (e.g., device 102B, device 102C, and device 102D) that did not interact with the communication to compare data items associated with the communication notification 116 with data items associated with entries in their corresponding local activity databases (e.g., local activity database 112 corresponds to device 102B). In at least one example, a related device (e.g., device 102B) that did not interact with the communication may determine that, based at least in part on comparing the data items associated with the communication notification 116 and the data items associated with the entries in the local activity database (e.g., local activity database 112), that the communication notification 116 and an entry (e.g., entry 114) in the local activity database correspond to a same communication event. In at least one example, based at least in part on the communication notification 116, the related device (e.g., device 102B) may determine that the communication was interacted with by another related device (e.g., device 102A). In at least one example, based at least in part on the communication notification 116, the related device (e.g., device 102B) may determine which related device interacted with the communication and details associated with the interaction. In at least one example, the related device (e.g., device 102B) may add an indication associated with the entry 114 corresponding to the communication event indicating that the communication was interacted with by another related device and/or identifying which of the related devices (e.g., device 102A) interacted with the communication.

Additionally and/or alternatively, for the related device (e.g., device 102A) that interacted with the communication, the communication notification 116 may cause a duplication of the communication event. That is, the local activity database 108 associated with the related device (e.g., device 102A) that interacted with the communication may include an entry 110 that corresponds to the communication event and the communication notification 116 may cause an additional entry associated with the same communication event to be added to the local activity database 108. In such examples, techniques described herein enable the related device (e.g., device 102A) that interacted with the communication to compare data items associated with the communication notification 116 with data items associated with entries in the local activity database 108 associated with the related device (e.g., device 102A). In at least one example, the related device (e.g., device 102A) may determine that, based at least in part on comparing the data items associated with the communication notification 116 and the data items associated with the entries in the local activity database 108, that the communication notification 116 and an entry (e.g., entry 110) in the local activity database correspond to a same communication event. Accordingly, the related device (e.g., device 102A) may refrain from adding an entry corresponding to the communication event associated with communication notification 116 to the local activity database 108. That is, in such examples, the related device (e.g., device 102A) may disregard the communication notification 116.

In some examples, a related device (e.g., device 102A) of the group of related devices (e.g., device 102A, device 102B, device 102C, and device 102D) may initiate a communication (e.g., call, message, etc.) and communication notifications 116 intended to make the other related devices (e.g., device 102B, device 102C, and device 102D) aware of the communication event may cause duplications for the related device (e.g., device 102A) that initiated the communication. As described above, one or more servers associated with the network(s) 104 may log communications in a remote data store (e.g., network activity database) and may provide communication notifications 116 associated with the communication events to enable event awareness for the group of related devices (e.g., device 102A, device 102B, device 102C, and device 102D). In at least one example, upon the initiation of the communication from the related device (e.g., device 102A), the one or more servers associated with the network(s) 104 may send a communication notification 116 to the group of related devices (e.g., device 102A, device 102B, device 102C, and device 102D). In at least one example, the communication notification 116 may include the data items, described above, associated with the communication event.

The related devices (e.g., device 102B, device 102C, and device 102D) that did not initiate the communication may to compare data items associated with the communication notification 116 with data items associated with entries in their corresponding local activity databases (e.g., local activity database 112 corresponds to device 102B). In at least one example, a related device (e.g., device 102B) may determine that, based at least in part on comparing the data items associated with the communication notification 116 and the data items associated with the entries in the local activity database (e.g., local activity database 112), that none of the entries in the local activity database (e.g., local activity database 112) correspond to the communication event associated with the communication notification 116. Accordingly, the related device (e.g., device 102B) may add an entry corresponding to the communication event into a corresponding local activity database (e.g., local activity database 112).

Alternatively, for the related device (e.g., device 102A) that initiated the communication, the communication notification 116 may cause a duplication of the communication event. That is, the local activity database (e.g., local activity database 108) associated with the related device (e.g., device 102A) that initiated the communication may include an entry that corresponds to the communication event and the communication notification 116 may cause an additional entry associated with the same communication event to be added to the local activity database (e.g., local activity database 108). In such examples, techniques described herein enable the related device (e.g., device 102A) that initiated the communication to compare data items associated with the communication notification 116 with data items associated with entries in the local activity database (e.g., local activity database 108) associated with the related device (e.g., device 102A). In at least one example, the related device (e.g., device 102A) may determine that, based at least in part on comparing the data items associated with the communication notification 116 with the data items associated with the entries in the local activity database (e.g., local activity database 108), that the communication notification 116 and an entry in the local activity database (e.g., local activity database 108) correspond to a same communication event. Accordingly, the related device (e.g., device 102A) may refrain from adding an entry corresponding to the communication event associated with communication notification 116 to the local activity database (e.g., local activity database 108). As described above, the related device (e.g., device 102A) may disregard the communication notification 116.

As described above, in additional and/or alternative examples, techniques described herein may be useful for related devices to avoid missed communications (e.g., calls, messages, etc.). In at least one example, presence information obtained from the presence server may be utilized to identify related devices (e.g., device 102A, device 102B, device 102C, and/or device 102D) that are currently online. In at least one example, a related device may be offline for a period of time. As described above, one or more servers associated with the network(s) 104 may log communication events associated external devices 106 and related devices (e.g., device 102A, device 102B, device 102C, and device 102D) in a remote local activity database and may provide communication notifications associated with the communication events to enable event awareness for the group of related devices (e.g., device 102A, device 102B, device 102C, and device 102D). In at least one example, upon determining that a related device of the group of related devices (e.g., device 102A, device 102B, device 102C, and device 102D) returns online, the one or more servers associated with the network(s) 104 may send the related device one or more communication notifications to enable the related device to become aware of communication events associated with the group of related devices (e.g., device 102A, device 102B, device 102C, and device 102D) while the related device was offline.

Figure 2:
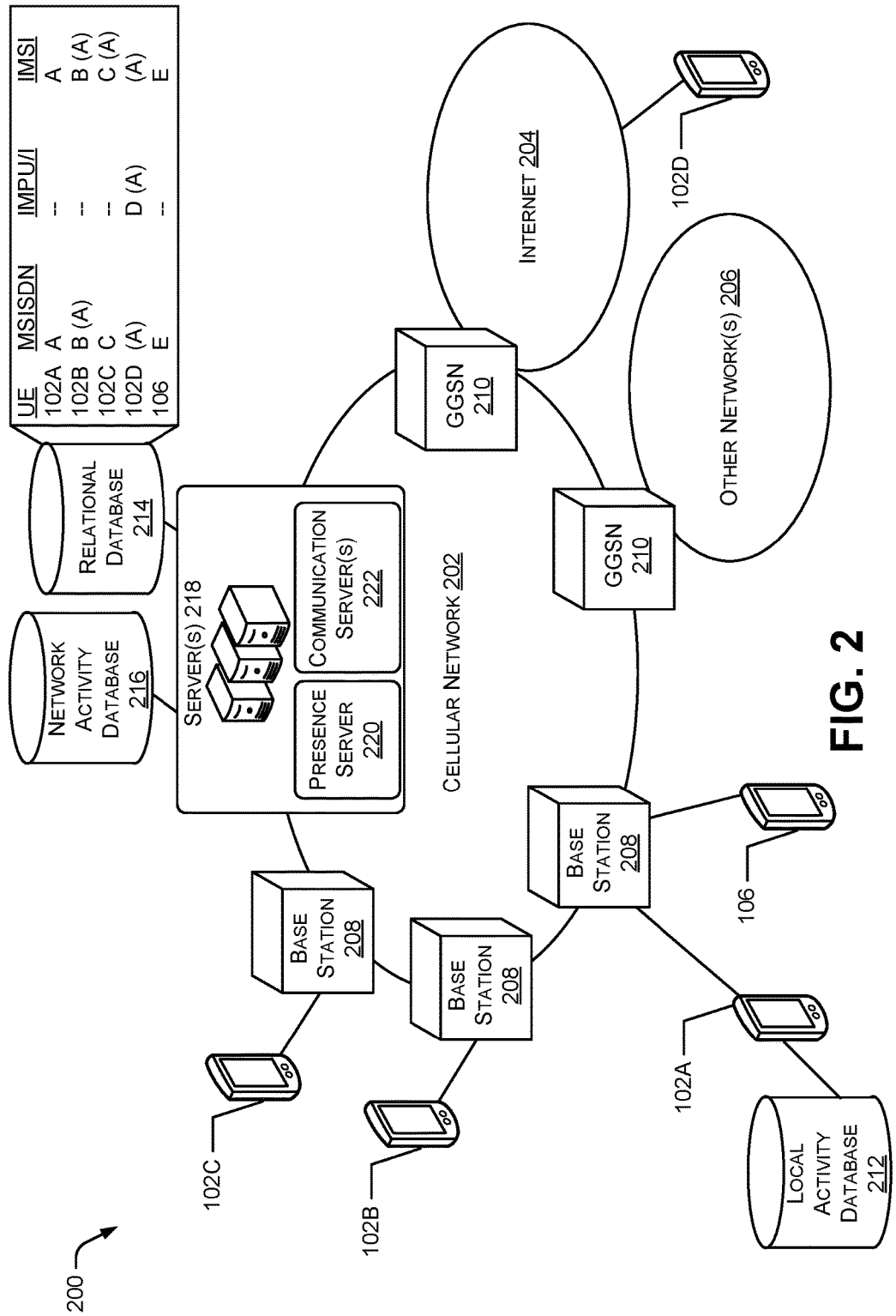
FIG. 2 illustrates additional details of the environment for facilitating device and/or line event awareness and smart synchronization illustrated in FIG. 1.

FIG. 2 illustrates an environment 200 for facilitating device and/or line event awareness and smart synchronization.

In at least one example, a related device (e.g., device 102A) communicates with an external device (e.g., device 106) and/or one or more related devices (e.g., device 102B, device 102C, and/or device 102D) via a cellular network 202, the Internet 204, and/or one or more other networks 206. The cellular network 202, the Internet 204, and/or the one or more other networks 206 may correspond to network(s) 104 with reference to FIG. 1. In at least one example, device 102A, device 102B, device 102C, and/or device 106 may connect to the cellular network 202 via a corresponding base station 208. The cellular network 202 may be responsible for routing voice communication to other networks 206, as well as routing data communication to external packet switched networks, such as the Internet 204. For example, the cellular network 202 may include a Gateway GPRS Support Node (GGSN) 210 or another equivalent node. Some related devices (e.g., device 102D) may not be capable of connecting through a base station 208 of the cellular network 202 but may register with the cellular network 202 through the Internet 204, described below.

In at least one example, each of the related devices (e.g., device 102A, device 102B, device 102C, and/or device 102D) and the external device 106 may correspond to user equipment (UE). The UE may include, but is not limited to, one or more of a smart phone, a personal digital assistant, a netbook, a laptop computer, a smart appliance, and/or another electronic device that is capable of sending or receiving voice, video, and/or data via the cellular network 202, the Internet 204, and/or one or more other network(s) 206 (e.g., a Wi-Fi network, another access network, etc.). In an example where a UE is a mobile device, the mobile device may include a subscriber identity module (SIM) card, which has an international mobile subscriber identity (IMSI) stored thereon. An IMSI is a unique 64-bit number. Within a GSM network, the IMSI is associated with the MSISDN, sometimes referred to as the "Mobile Station International Subscriber Directory Number," or more commonly as the telephone number. The MSISDN is a unique number that identifies a subscription on a GSM network and is also the number that may be used to place a call to the GSM phone. The MSISDN is not necessarily stored on the SIM card or the phone, and the MSISDN is not permanently associated with the IMSI. The MSISDN may change if the subscription changes, for example.

In some examples, multiple UEs are registered with a common number (e.g., MSISDN, IMPU, IMPI, etc.) ("line," as used herein) and/or are associated with a common subscriber account (e.g., IMSI) ("account," as used herein), and thus are "related devices," as used herein. For example, all related devices (e.g., device 102A, device 102B, device 102C, and/or device 102D) may have their own unique IMSI programmed into their respective SIM cards, and which are associated with a specific telephone number (MSISDN), which may also be unique to each related device (e.g., device 102A, device 102B, device 102C, and/or device 102D). But the IMSI and MSISDN pair may be associated in the network with "alias numbers" to allow for shared lines and/or shared accounts, thereby making them related devices.

Some related devices (e.g., device 102D), which may not be capable of connecting through a base station 208 of the cellular network 202, may register with the cellular network 202 through the Internet 204 using a unique identifier, such as an IMPI or IMPU, a globally routable user agent URI (GRUU), or other. In at least one example, these identifiers may take the form of a telephone number (e.g., they may resemble a MSISDN). The cellular network 202 forwards calls and/or messages to the device 102D, and the device 102D may be enabled to send or receive calls and/or messages in a same or similar way as with related devices (e.g., device 102A, device 102B, device 102C, and/or device 102D).

In at least one example, each of the related devices (e.g., device 102A, device 102B, device 102C, and/or device 102D) may be associated with a local activity database 212. The local activity database 212 may correspond to any of the local activity databases (e.g., local activity database 108 and 112) described above with reference to FIG. 1. That is, in at least one example, the local activity database 212 may include entries corresponding to communication events. Each of the entries may be associated with data items corresponding to the communication events. Examples of data items are described above.

In at least one example, line and/or account associations for related devices (e.g., device 102A, device 102B, device 102C, and/or device 102D) may be stored in a relational database 214. Non-limiting examples of the IMSI and MSISDN associations for related devices (e.g., device 102A, device 102B, device 102C, and/or device 102D) are depicted in relational database 214. For instance, device 102A is associated with IMSI A and MSISDN A. Device 102B is associated with IMSI B and MSISDN B, but also with alias MSISDN A and alias IMSI A. Thus, device 102B is associated both with the same account and with the same line as device 102A. Device 102C is associated with IMSI C and MSISDN C, but also with alias IMSI A. Thus, device 102C shares an account (IMSI A) but not a telephone line with device 102A. As illustrated in relational database 214 in FIG. 2, device 102D is associated with IMPU D and also with alias IMPU A. Device 102D therefore shares a telephone line with devices 102A and device 102B and an account with device 102A, device 102B, and device 102C.

In addition to the relational database 214, the cellular network 202 may be associated with a network activity database 216. The network activity database 216 may correspond to a remote data store, described above with reference to FIG. 1. The network activity database 216 may include entries corresponding to communication events associated with the confined grouping of related devices (e.g., device 102A, device 102B, device 102C, and/or device 102D). Each of the entries may be associated with data items, as described herein. In some examples, the network activity database 216 may store additional and/or alternative data including data associated with contacts, etc.

The relational database 214 and the network activity database 216 may be associated with server(s) 218. In various embodiments, each of the server(s) 218 may be any type of server, such as a network-accessible server. In various examples, each of the server(s) 218 may be associated with one or more processor(s) and computer-readable media, which may execute one or more modules and/or processes to cause the server(s) 218 to perform a variety of functions, as set forth above and explained in further detail in the following disclosure.

In at least one example, the server(s) 218 may include a presence server 220 and one or more communication servers 222. The presence server 220 may retrieve data that corresponds to the MSISDN, IMSI, IMPU/IMPI, etc. of the related devices (e.g., device 102A, device 102B, device 102C, and/or device 102D) from the relational database 214. The data may include information specifying the associated device number (e.g., a MSISDN, IMPI, IMPU, IMSI, or the like) for which the related devices (e.g., device 102A, device 102B, device 102C, and/or device 102D) are able to utilize for initiating, sending, and/or receiving communications. Thus, the presence information provided to a related device (e.g., device 102A) regarding one or more of the other related devices (e.g., device 102B, device 102C, and/or device 102D), which may indicate the shared line or account (e.g., may indicate whether and how the devices are related devices), may enable the related device (e.g., device 102A) to recognize that the other related devices (e.g., device 102B, device 102C, and/or device 102D) are related devices that share the same account and/or line as the device 102A, as well as to distinguish devices that are not related devices (such as device 106). In some examples, the related device (e.g., device 102A) may request from the presence server 220 a list of related devices (e.g., device 102B, device 102C, and/or device 102D).

In at least one example, a related device (e.g., device 102A) may be configured to obtain presence information for one or more contacts, including the related devices (e.g., device 102B, device 102C, and/or device 102D), from the presence server 220. The presence server 220 may be a SIP server, and the related device (e.g., device 102A) may be configured to utilize OMA Presence SIMPLE to obtain presence information regarding one or more contacts, including the related devices (e.g., device 102B, device 102C, and/or device 102D). In some examples, a related device (e.g., device 102A) may utilize presence information to determine which contacts correspond to related devices. For example, the presence information may include information about telephone numbers with which the mobile devices are registered. A related device (e.g., device 102A) may utilize the presence information—including for example an IP address or other information—to establish a connection with the related devices (e.g., device 102B, device 102C, and/or device 102D). In some examples, presence information obtained from the presence server 220 may be utilized to identify those related devices (e.g., device 102A, device 102B, device 102C, and/or device 102D) that are currently online.

In some examples, the related devices (e.g., device 102A, device 102B, device 102C, and/or device 102D) may be configured to provide their presence information to the presence server 220. Additionally and/or alternatively, the related devices (e.g., device 102A, device 102B, device 102C, and/or device 102D) may be configured to provide capabilities information to the presence server 220. The capabilities information may indicate an ability to receive calls, receive messages, receive shared content, receive shared video conversations, receive communication notifications, and so forth. In other examples, the related devices (e.g., device 102A, device 102B, device 102C, and/or device 102D) may obtain each other's presence information and/or capabilities information in other ways, such as through static configuration, peer-to-peer connections, and so forth.

The communication server(s) 222 may facilitate sending and receiving communications. In at least one example, the communication server(s) 222 include a telephony application server that may be used for voice, message, and video communications via the cellular network 202, Internet 204, and/or other network(s) 206.

Figure 3:
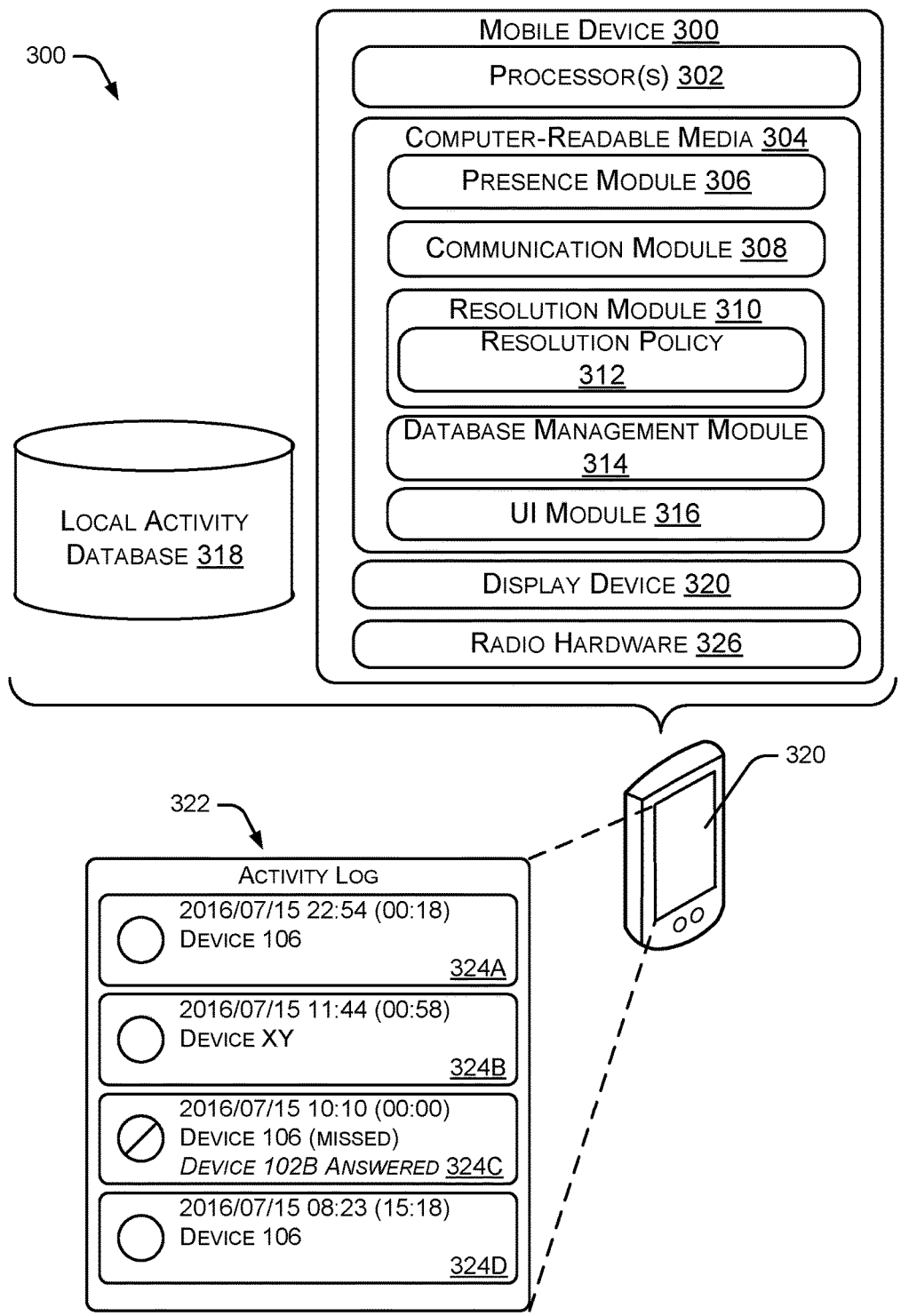
FIG. 3 illustrates an example mobile device configured to enable smart synchronization.

FIG. 3 illustrates an example mobile device 300 configured to enable smart synchronization. Mobile device 300 may correspond to any one of related devices (e.g., device 102A, device 102B, device 102C, and/or device 102D); however, for the purpose of this discussion, mobile device 300 corresponds to device 102A. As illustrated in FIG. 3, the mobile device 300 includes processor(s) 302 and computer-readable media 304.

Processor(s) 302 can represent, for example, a CPU-type processing unit, a GPU-type processing unit, a Field-Programmable Gate Array (FPGA), another class of Digital Signal Processor (DSP), or other hardware logic components that can, in some instances, be driven by a CPU. For example, and without limitation, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), etc. In at least one example, an accelerator can represent a hybrid device, such as one from ZYLEX or ALTERA that includes a CPU course embedded in an FPGA fabric. In various embodiments, the processor(s) 302 can execute one or more modules and/or processes to cause the mobile device 300 to perform a variety of functions, as set forth above and explained in further detail in the following disclosure. Additionally, each of the processor(s) 302 can possess its own local memory, which also can store program modules, program data, and/or one or more operating systems.

Depending on the exact configuration and type of the mobile device 300, the computer-readable media 304, can include computer storage media and/or communication media.

Computer storage media can include volatile memory, nonvolatile memory, and/or other persistent and/or auxiliary computer storage media, removable and non-removable computer storage media implemented in any method or technology for storage of information such as computer readable instructions, data structures, program modules, or other data. Computer memory is an example of computer storage media. Thus, computer storage media includes tangible and/or physical forms of media included in a device and/or hardware component that is part of a device or external to a device, including but not limited to random-access memory (RAM), static random-access memory (SRAM), dynamic random-access memory (DRAM), phase change memory (PRAM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, miniature hard drives, memory cards, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In at least one example, the computer storage media can include non-transitory computer-readable media. Non-transitory computer-readable media can include volatile and nonvolatile, removable and non-removable tangible, physical media implemented in technology for storage of information, such as computer readable instructions, data structures, program modules, or other data. Computer-readable media 304 is an example of non-transitory computer-readable media. Non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, physical medium which can be used to store the desired information and which can be accessed by the mobile device 300. Any such non-transitory computer-readable media can be part of the mobile device 300.

In contrast, communication media includes computer readable instructions, data structures, program modules, or other data in a modulated data signal, such as a carrier wave, or other transmission mechanism. As defined herein, computer storage media does not include communication media.

The computer-readable media 304 can include one or more modules and data structures including, for example, a presence module 306, a communication module 308, a resolution module 310, including a resolution policy 312, a database management module 314, and a user interface (UI) module 316. The one or more modules and data structures can be in the form of stand-alone applications, productivity applications, an operating system component, or any other application or software module having data items that facilitate interactions between related devices (e.g., device 102A, device 102B, device 102C, and/or device 102D), external device(s) (e.g., device 106), the server(s) 218, and/or one or more networks (e.g., cellular network 202, Internet 204, other network(s) 206, etc.), as described herein.

The presence module 306 may be configured to retrieve presence information associated with one or more related devices (e.g., device 102A, device 102B, device 102C, and/or device 102D). As described above, presence information obtained from the presence server 220 may be utilized to identify related devices (e.g., device 102A, device 102B, device 102C, and device 102D). The presence module 306 may be configured to retrieve the presence information from the presence server 220, such as via OMA Presence SIMPLE protocol, or in some other fashion, as described above. In at least one example, the presence module 306 may provide presence information to the presence server 220. Additionally and/or alternatively, presence module 306 may be configured to provide capabilities information, described above, to the presence server 220.

The communication module 308 may facilitate communications between the mobile device 300 and one or more other related devices (e.g., device 102B, device 102C, and device 102D) and/or an external device 106. For instance, the communication module 308 may facilitate sending calls, messages, etc. to one or more other related devices (e.g., device 102B, device 102C, and device 102D) and/or an external device 106 and/or receiving calls, messages, etc. from one or more other related devices (e.g., device 102B, device 102C, and device 102D) and/or an external device 106.

The resolution module 310 may receive communication notifications and may compare data items associated with communication notifications to data items associated with entries stored in a local activity database 318 to determine whether to add a new entry associated with a communication notification to the local activity database 318 or disregard the communication notification as a duplicate of an entry that is already stored in the local activity database 318. In at least one example, the resolution module 310 may access entries in the local activity database 318 that correspond to communication events associated with the mobile device 300 and/or one or more related devices (e.g., device 102B, device 102C, and device 102D). The local activity database 318 may correspond to the local activity database 108 described above with reference to FIG. 1 and the local activity database 212 described above with reference to FIG. 2. That is, in at least one example, the local activity database 318 may include entries corresponding to communication events and data items associated with each of the communication events, described above. The local activity database 318 may be managed by the database management module 314. In at least one example, the database management module 314 may define the local activity database 318, create the local activity database 318, receive and/or determine data stored in the local activity database 318, analyze data stored in the local activity database 318, manage data stored in the local activity database 318, update data stored in the local activity database 318, and otherwise administer the local activity database 318.

As described above, in at least one example, upon receiving a communication notification, the resolution module 310 may access entries in the local activity database 318 to compare data items associated with the entries with the data items associated with the communication notification. The resolution module 310 may compare the data items of individual entries and data items of the communication notification to determine whether an entry in the local activity database 318 corresponds to a same communication event as the communication event represented by the communication notification. In at least one example, the resolution module 310 may determine that an entry and a communication notification correspond to a same communication event based at least in part on determining that one or more corresponding data items are similar. For the purpose of this discussion, a data item may be similar to another data item if the data items match (e.g., are the same) or are within a threshold of one another, as described below.

As described above, in at least one example, the resolution module 310 may determine that a first data item associated with an entry representing and a second data item associated with a communication notification are similar based at least in part on determining that the first data item and the second data item are the same (e.g., match). For instance, a first data item associated with an entry may correspond to one or more participants (based on communication addresses or subscriber accounts) of a corresponding communication event and a second data item associated with a communication notification may correspond to one or more participants (based on communication addresses or subscriber accounts) of a corresponding communication event. In at least one example, the resolution module 310 may determine that the first data item and the second data item are similar based at least in part on determining that participants corresponding to the first data item are the same as the participants corresponding to the second data item.

Additionally and/or alternatively, a first data item associated with an entry may correspond to a first date of a corresponding communication event and a second data item associated with a communication notification may correspond to a second date of a corresponding communication event. The resolution module 310 may determine that a first data item and a second data item are similar based at least in part on determining that the first date and the second date are the same date. In at least one example, a first data item associated with an entry may correspond to a first type of call of a corresponding communication event and a second data item associated with a communication notification may correspond to a second type of call corresponding communication event. The resolution module 310 may determine that a first data item and a second data item are similar based at least in part on determining that the first type of call and the second type of call are the same type of call (e.g., both voice calls, both video calls, etc.).

Additionally and/or alternatively, a first data item associated with an entry may correspond to a first hash or fingerprint identifying a corresponding communication event and a second data item associated with a communication notification may correspond to a second hash or fingerprint identifying a corresponding communication event. The resolution module 310 may determine that a first data item and a second data item are similar based at least in part on determining that the first hash or fingerprint and the second hash or fingerprint are the same hash or fingerprint, respectively.

In additional and/or alternative examples, the resolution module 310 may determine that a first data item associated with an entry and a second data item associated with a communication notification are similar based at least in part on determining that an extent to which the first data item is different from the second data item is below a threshold. In some examples, data items associated with communication notifications may vary slightly from the data items associated with entries in a local activity database 318 corresponding to same communication events. In at least one example, such variations may be caused by delays in communication between the related devices (e.g., device 102A, device 102B, device 102C, device 102D, etc.) and the network(s) 104. As a non-limiting example, a data item associated with an entry may correspond to a first timestamp indicating a start time of a call and a data item associated with a corresponding communication notification may correspond to a second timestamp indicating a start time of the call. The first timestamp and the second timestamp may be several seconds apart (e.g., 3 seconds, 5 seconds, 12 seconds, etc.). That is, the data item associated with the entry may indicate that the call started earlier than the data item associated with the communication notification. In additional and/or alternative examples, data processing (e.g., semantic analysis, image recognition analysis, etc.) may be associated with an error margin that may prevent results of such processing from being identical. Accordingly, in at least some examples, the resolution module 310 may determine that a first data item associated with an entry and a second data item associated with a communication notification are similar based at least in part on determining that an extent to which the first data item is different from the second data item is below a threshold.

In at least one example, the resolution module 310 may determine that a first data item associated with an entry and a second data item associated with a communication notification are similar based at least in part on determining that time differential between a first timestamp associated with the first data and a second timestamp associated with the second data item is below a threshold. As described above each data item corresponding to time may be associated with a timestamp. For instance, a start time of a call may be associated with a timestamp associated with when the call was initiated, an end time of a call may be associated with a timestamp associated with when the call was terminated, a send time of a message may be associated with a timestamp associated with when the message was sent, a received time of a message may be associated with a timestamp associated with when the message was received, a read time of a message may be associated with a timestamp associated with when the message was opened (and presumably read), etc. In at least one example, the resolution module 310 may compare a first timestamp associated with a first data item with a second timestamp associated with a second data item to determine the amount of time between the first timestamp and the second timestamp. Based at least in part on determining that the amount of time is below a threshold amount of time (e.g., 5 seconds, 10 seconds, 12 seconds, etc.), the resolution module 310 may determine that the first data item and the second data item are similar data items.

Additionally and/or alternatively, the resolution module 310 may compare a first amount of time corresponding to a first duration associated with a first data item with a second amount of time corresponding to a second duration associated with a second data item and may determine a difference in the first amount of time and the second amount of time. Based at least in part on the difference being below threshold (e.g., 2 seconds, 5 seconds, etc.), the resolution module 310 may determine that the entry and the event notification are associated with the same communication event.

In at least one example, the resolution module 310 may compare content of messages to determine whether an entry and a communication notification correspond to a same communication event. In such examples, a first data item may correspond to content associated with an entry and a second data item may correspond to content associated with a communication notification. The resolution module 310 may perform semantic analysis, image recognition analysis, etc. on the content associated with the first data item and the content associated with a second data item. Based at least in part on differences between the results of the semantic analysis, image recognition analysis, etc. being less than a threshold (i.e., a similarity of the results being above a threshold), the resolution module 310 may determine that the entry and the communication notification correspond to a same communication event.

In at least one example, the resolution module 310 may be associated with a resolution policy 312 that may identify one or more requirements for determining that an entry and a communication notification correspond to a same communication event. For instance, the resolution policy 312 may specify a minimum number of data items that must be similar to determine that an entry and a communication notification correspond to a same communication event. In such examples, the minimum number may correspond to a threshold number. That is, in at least one example, the resolution module 310 may determine that an entry in the local activity database 318 corresponds to a same communication event as the communication notification based at least in part on determining that more than a threshold number of data items associated with the entry are similar to the data items associated with the communication notification.

In at least one example, the number associated with the threshold number of data items may be determined based on a level of certainty desired. For instance, in some examples where a high level of certainty is desired, the threshold number may correspond to all of the data items associated with the first communication event. That is, all of the data items associated with an entry may need to be similar to data items associated with a communication notification in order for the resolution module 310 to determine that the entry and the communication notification correspond to a same communication event. In other examples, the threshold number may correspond to fewer than all data items. In at least one example, the threshold number may be predetermined.

Additionally, in some examples, the resolution policy 312 may specify one or more data items that must be similar in order to determine that an entry and a communication notification correspond to a same communication event. That is, in at least one example, the resolution policy 312 may include a requirement that at least data items corresponding to participants of the communication event associated with the entry and the communication notification are similar. Or, in another example, the resolution policy 312 may include a requirement that, at a minimum, participants of the communication event associated with the entry and the communication notification are similar and that dates of the communication events associated with the entry and the communication notification are similar. As another example, the resolution policy 312 may include a requirement that, at a minimum, participants of the communication events associated with the entry and the communication notification are similar, dates of the communication events associated with the entry and the communication notification are similar, and at least one other corresponding set of data items are similar.

The UI module 316 may be configured to cause a presentation of a graphical representation of at least some of the entries in the local activity database 318 via a display device 320 associated with the mobile device 300. In at least one example, the UI module 316 may generate a graphical user interface 322 that may be presented via the display device 320. The graphical user interface 322 may be interactive such to enable a user associated with the mobile device 300 to view to communication events associated with the mobile device 300 and/or one or more related devices (e.g., device 102B, device 102C, and device 102D). A non-limiting example of a graphical user interface 322 is shown in FIG. 3.

Graphical user interface 322 includes a plurality of user interface elements 324A-324D that each represent an entry in the local activity database 318. While four user interface elements are shown, any number of user interface elements may be displayed. In at least some examples, the size of the viewport (e.g., a visible area on the display device 320) may prohibit user interface elements associated with all entries in the local activity database 318 from being displayed at the same time. In such examples, the user interface elements corresponding to the most recent entries may be displayed in the viewport and a user may scroll or otherwise manipulate the graphical user interface 322 to see user interface elements 324A-324D associated with additional and/or alternative entries. As shown, each user interface element 324A-324D includes at least some data items associated with a communication event that it represents. For instance, user interface element 324A includes the date of the communication event, a start time of the communication event, a duration of the communication event, and the other participant associated with the communication event (e.g., device 106). Alternatively, user interface element 324C includes the date of the communication event, a start time of the communication event, a duration of the communication event, the other participant associated with the communication event (e.g., device 106), an indication that mobile device 300 missed the communication event, and an indication that a related device (e.g., device 102B) answered the communication event. Additional and/or alternative data items may be included in the user interface elements.

Radio hardware 326 provides wireless UE capabilities, such as connecting to a cellular network base station, a Wi-Fi network, or other wireless networks. The radio hardware 326 may include or be incorporated into processors, application-specific integrated circuits (ASICs), programmable circuits such as field programmable gate arrays (FPGAs), or in other ways. The software modules stored on the computer-readable media 304 are configured to access hardware via interrupts, calling APIs, and the like. The software modules may also be configured to pass information to one another, such as through APIs, by storing commands, parameters, etc. in a predetermined memory location, etc. Other examples are possible without departing from the scope of this disclosure.

Figure 4:
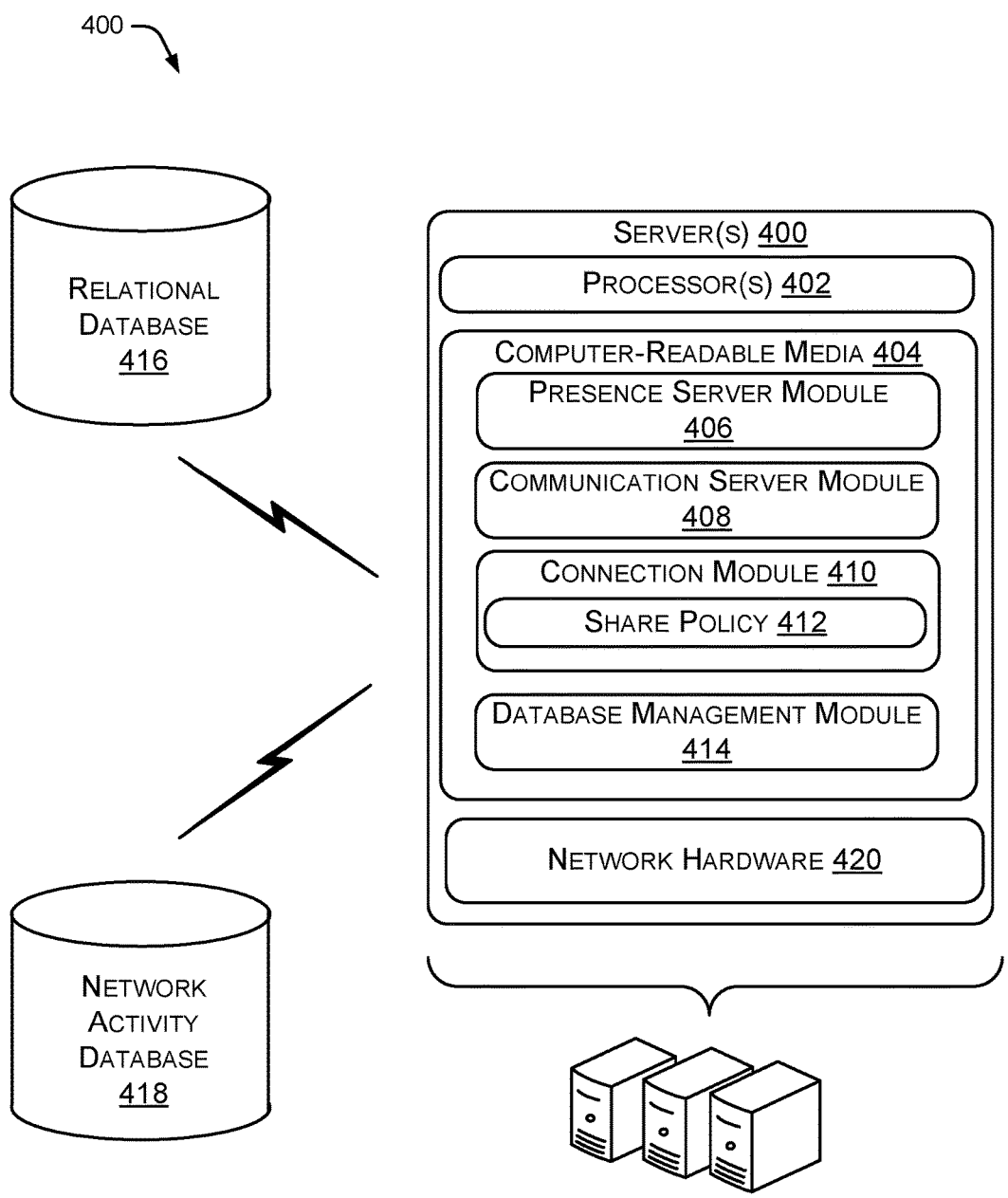
FIG. 4 illustrates example server(s) configured to provide communication notifications to related devices for facilitating device and/or line event awareness.

FIG. 4 illustrates example server(s) 400 configured to provide communication notifications to related devices. In at least one example, servers 400 may correspond server(s) 218 with reference to FIG. 2.

As illustrated in FIG. 4, the server(s) 400 include processor(s) 402 and computer-readable media 404. Processor(s) 402 can represent, for example, a CPU-type processing unit, a GPU-type processing unit, a Field-Programmable Gate Array (FPGA), another class of Digital Signal Processor (DSP), or other hardware logic components that can, in some instances, be driven by a CPU. For example, and without limitation, illustrative types of hardware logic components that can be used include Application-Specific Integrated Circuits (ASICs), Application-Specific Standard Products (ASSPs), System-on-a-Chip systems (SOCs), Complex Programmable Logic Devices (CPLDs), etc. In at least one example, an accelerator can represent a hybrid device, such as one from ZYLEX or ALTERA that includes a CPU course embedded in an FPGA fabric. In various embodiments, the processor(s) 402 can execute one or more modules and/or processes to cause the servers 400 to perform a variety of functions, as set forth above and explained in further detail in the following disclosure. Additionally, each of the processor(s) 402 can possess its own local memory, which also can store program modules, program data, and/or one or more operating systems.

Depending on the exact configuration and type of the servers 400, the computer-readable media 404, can include computer storage media and/or communication media.

Computer storage media can include volatile memory, nonvolatile memory, and/or other persistent and/or auxiliary computer storage media, removable and non-removable computer storage media implemented in any method or technology for storage of information such as computer readable instructions, data structures, program modules, or other data. Computer memory is an example of computer storage media. Thus, computer storage media includes tangible and/or physical forms of media included in a device and/or hardware component that is part of a device or external to a device, including but not limited to random-access memory (RAM), static random-access memory (SRAM), dynamic random-access memory (DRAM), phase change memory (PRAM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, miniature hard drives, memory cards, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In at least one example, the computer storage media can include non-transitory computer-readable media. Non-transitory computer-readable media can include volatile and nonvolatile, removable and non-removable tangible, physical media implemented in technology for storage of information, such as computer readable instructions, data structures, program modules, or other data. Computer-readable media 404 is an example of non-transitory computer-readable media. Non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, physical medium which can be used to store the desired information and which can be accessed by the presence server. Any such non-transitory computer-readable media can be part of the presence server.

In contrast, communication media includes computer readable instructions, data structures, program modules, or other data in a modulated data signal, such as a carrier wave, or other transmission mechanism. As defined herein, computer storage media does not include communication media.

The computer-readable media 404 can include one or more modules and data structures including, for example, a presence server module 406, a communication server module 408, a connection module 410, including a share policy 412, and a database management module 414. The one or more modules and data structures can be in the form of stand-alone applications, productivity applications, an operating system component, or any other application or software module having data items that facilitate interactions between the server(s) 400, one or more related devices (e.g., device 102A, device 102B, device 102C, and/or device 102D), and/or one or more networks (e.g., cellular network 202, Internet 204, and/or other network(s) 206), as described herein.

The presence server module 406 may provide presence server services to devices, including the related devices (e.g., device 102A, device 102B, device 102C, and/or device 102D). The presence server module 406 may be configured to register online presence information of various devices, and/or to provide presence information and/or capabilities information, as described above, regarding the various devices. The presence server module 406 may look up information regarding groups of related devices in a relational database 416, described below, and provide presence information and/or capabilities information regarding those related devices (e.g., device 102A, device 102B, device 102C, and/or device 102D) to other ones of the related devices (e.g., device 102A, device 102B, device 102C, and/or device 102D). The presence server module 406 may be configured to provide presence information and/or capabilities information using OMA Presence SIMPLE protocol, or in some other fashion.

The communication server module 406 may provide communication server services to devices, including the related devices (e.g., device 102A, device 102B, device 102C, and/or device 102D) and/or external devices (e.g., device 106). That is, the communication server module 406 may facilitate sending and receiving calls, messages, etc. to and/or from the related devices (e.g., device 102A, device 102B, device 102C, and/or device 102D) and/or external devices (e.g., device 106). In at least one example, the communication server module 406 may receive a communication and may determine a communication event based on the communication. The communication server module 406 may send a signal indicating a communication event (e.g., a call, a message, etc.) to a database management module 414, described below.

The connection module 408 may be configured, in some embodiments, to facilitate establishment of connections between devices, including establishment of connections between related devices (e.g., device 102A, device 102B, device 102C, and/or device 102D). In some examples, the connection module 408 may be configured to utilize a share policy 412. The share policy 412 may be based at least in part on presence information, capabilities information, and/or preference information. The share policy 412 may indicate that certain communication notifications may be shared with related devices (e.g., device 102A, device 102B, device 102C, and/or device 102D), and that such communication notifications may not to be shared with other devices that do not share a line or account. In other examples, the share policy 412 may indicate that certain communication notifications may be shared with certain related devices (e.g., device 102A, device 102B, device 102C, and/or device 102D), and that such communication notifications may not to be shared with other related devices (e.g., device 102A, device 102B, device 102C, and/or device 102D). The connection module 408 may therefore allow certain communication notifications to be shared with certain related devices (e.g., device 102A, device 102B, device 102C, and/or device 102D), but deny requests to share communication notifications with other devices.

The database management module 414 may be configured to manage a relational database 416 and/or a network activity database 418. In at least one example, the server(s)

400 may be associated with a relational database 416 and a network activity database 418. In some examples, the relational database 416 and/or the network activity database 418 may be integral to the server(s) 400. In other examples, the relational database 416 and/or the network activity database 418 may be communicatively coupled to the server(s) 400. In at least one example, the relational database 416 may correspond to the relational database 214 described above with reference to FIG. 2 and the network activity database 418 may correspond to the network activity database 216 described above with reference to FIG. 2. That is, the relational database 416 may store line and/or account associations for related devices (e.g., device 102A, device 102B, device 102C, and/or device 102D) and the network activity database 418 may store entries corresponding to communication events associated with the related devices (e.g., device 102A, device 102B, device 102C, and/or device 102D).

In at least one example, the database management module 414 may define the relational database 416 and/or the network activity database 418, create the relational database 416 and/or the network activity database 418, receive and/or determine data that is stored in the relational database 416 and/or the network activity database 418, analyze the data that is stored in the relational database 416 and/or the network activity database 418, update the data that is stored in the relational database 416 and/or the network activity database 418, and otherwise administer the relational database 416 and/or the network activity database 418. In at least one example, the communication server module 406 may send a signal indicating a communication event (e.g., a call, a message, etc.) to the database management module 414. In such an example, the database management module 414 may generate an entry corresponding to the communication event and may update the network activity database 418 with the entry. Additionally, the database management module 414 may generate a communication notification associated with the communication event. The communication notification may include data items associated with the communication event, as described above. The database management module 414 may send the communication notification to each of the related devices in the group of related devices (e.g., device 102A, device 102B, device 102C, and/or device 102D), as described above with reference to FIG. 1.

Network hardware 420 provides wired or wireless networking capabilities to the server(s) 400. The network hardware 420 may include or be incorporated into processors, application-specific integrated circuits (ASICs), programmable circuits such as field programmable gate arrays (FPGAs), or in other ways. The software modules stored on the computer-readable media 404 are configured to access hardware via interrupts, calling APIs, and the like. The software modules may also be configured to pass information to one another, such as through APIs, storing commands, parameters, etc. in a predetermined memory location, etc. Other examples are possible without departing from the scope of this disclosure.

FIGS. 5-8 describe example processes for facilitating device and/or line event awareness and smart synchronization for related devices. The example processes are described in the context of the environments of FIGS. 1-4, but are not limited to those environments. That is, as used herein, a related device may be any device of devices 102A-102D in FIGS. 1 and 2 and a group of related devices may refer to all of the devices associated with a same line and/or account (e.g., e.g., device 102A, device 102B, device 102C, and/or device 102D).

Figure 5:
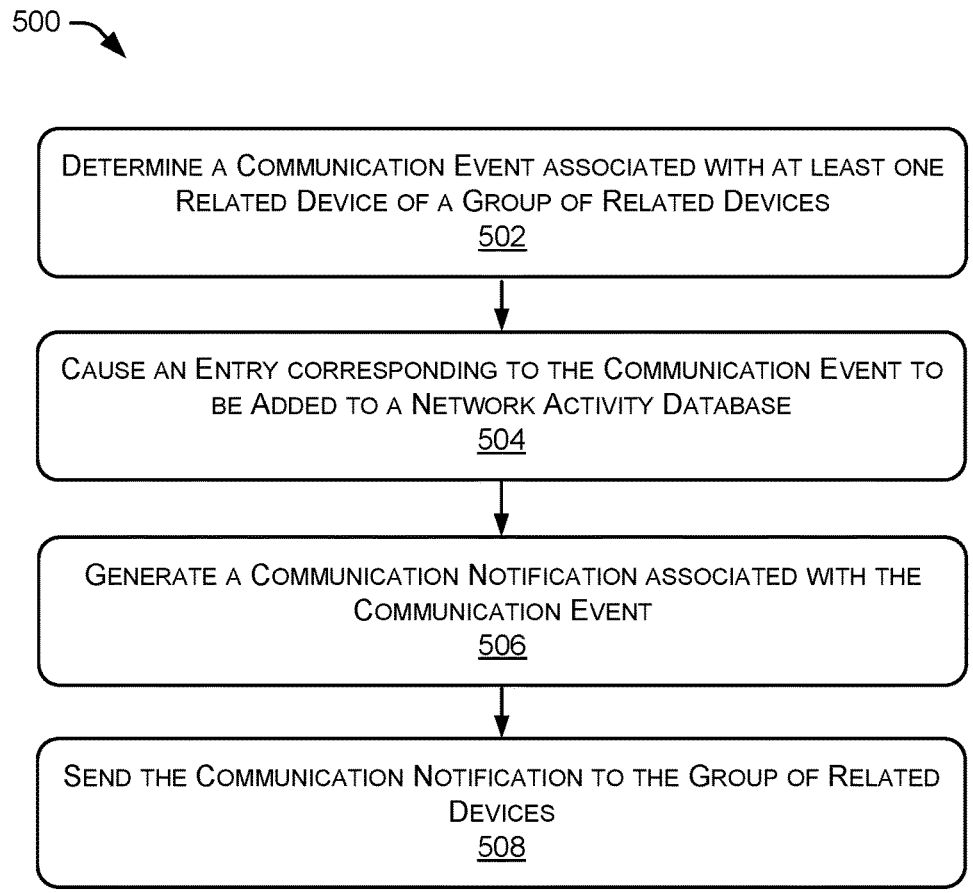
FIG. 5 illustrates an example process for providing communication notifications to related devices for facilitating device and/or line event awareness.

FIG. 5 illustrates an example process 500 for providing communication notifications to related devices.

Block 502 illustrates determining a communication event associated with at least one related device of a group of related devices. As described above, the communication server module 406 associated with the server(s) 400 may provide communication server services to one or more related devices. That is, the communication server module 406 may facilitate sending and receiving calls, messages, etc. to and/or from the one or more related devices. In at least one example, the communication server module 406 may determine a communication event and may send a signal indicating a communication event to a database management module 414.

Block 504 illustrates causing an entry corresponding to the communication event to be added to a network activity database 418. In at least one example, the database management module 414 may receive the signal from the communication server module 406 and may generate an entry corresponding to the communication event. The database management module 414 may update the network activity database 418 by adding the entry to the network activity database 418, as described above.

Block 506 illustrates generating a communication notification associated with the communication event. As described above, the database management module 414 may also generate a communication notification associated with the communication event. The communication notification may include data items associated with the communication event, as described above.

Block 508 illustrates sending the communication notification to the group of related devices. The database management module 414 may send the communication notification to related devices in the group of related devices, as described above with reference to FIG. 1. As described above, such communication notifications may enable event awareness for the devices in the group of related devices.

Figure 6:
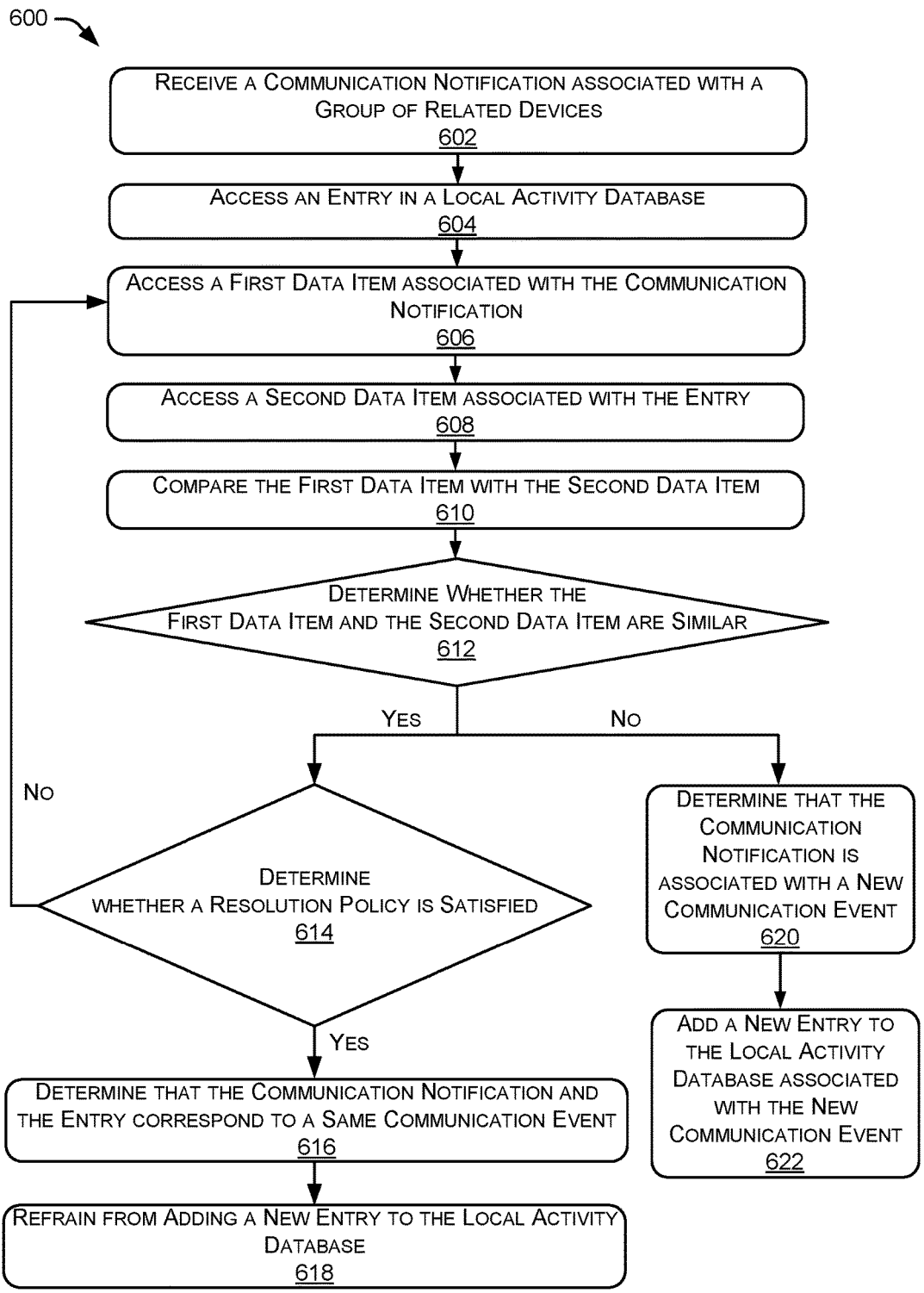
FIG. 6 illustrates an example process for determining whether a new entry associated with a communication notification should be added in a local activity database or disregarded as a duplicate of an entry that is already stored in the local activity database.

FIG. 6 illustrates an example process 600 for determining whether to add a new entry associated with a communication notification to a local activity database or to disregard the communication notification as a duplicate of an entry that is already stored in the local activity database.

Block 602 illustrates receiving a communication notification associated with a group of related devices. As described above, a resolution module 310 associated with a related device may receive communication notifications sent from a database management module 414 associated with server(s) 400. As described above, such communication notifications may enable event awareness for each of the devices in the group of related devices.

Block 604 illustrates accessing an entry in a local activity database. In at least one example, the resolution module 310 may access entries stored in a local activity database 318 that correspond to communication events associated with the related device and/or one or more other related devices. As described above, each of the entries may be associated with one or more data items associated with each of the communication events. Data items may describe various details associated with communication events corresponding to the entries.

Block 606 illustrates accessing a first data item associated with the communication notification. As described above, the communication notifications may be associated with one or more data items. Data items may describe various details associated with a communication event. In at least one example, upon receiving a communication notification, the resolution module 310 may access a first data item associated with the communication event.

Block 608 illustrates accessing a second data item associated with the entry. As described above, each of the entries in the local activity database 318 may be associated with one or more data items. In at least one example, upon receiving a communication notification, the resolution module 310 may access a second data item associated with an entry of the entries in the local activity database 318.

Block 610 illustrates comparing the first data item with the second data item. The resolution module 310 may compare the data items associated with individual entries with data items associated with the communication event represented by the communication notification to determine whether an entry in the local activity database 318 corresponds to a same communication event as the communication event represented by the communication notification. In at least one example, the resolution module 310 may compare the first data item with the second data item.

Block 612 illustrates determining whether the first data item and the second data item are similar. The resolution module 310 may compare the data items of individual entries and data items of the communication event represented by the communication notification to determine whether there are similarities between data items. In at least one example, the resolution module 310 may compare the first data item and the second data item to determine whether the first data item and the second data item are similar. As described above, a data item may be similar to another data item if the data items match (e.g., are the same). In some examples, however, the data items associated with communication notifications may vary slightly from the data items associated with entries in a local activity database 318 corresponding to same communication events. In at least one example, such variations may be caused by delays in communication between the related devices and the network (s) 104. Additionally and/or alternatively, data processing (e.g., semantic analysis, image recognition analysis, etc.) may be associated with an error margin that may prevent results of such processing from being identical. Accordingly, in such examples, a data item may be similar to another data item if an extent to which the data items differ is below a threshold. As described above, the threshold may correspond to a threshold amount of time, a threshold similarity, etc.

Block 614 illustrates determining whether a resolution policy is satisfied. Based at least in part on determining that the first data item and the second data item are similar, the resolution module 310 may determine whether a resolution policy 312 is satisfied. In at least one example, the resolution module 310 may be associated with a resolution policy 312 that may identify one or more requirements for determining that an entry and a communication notification correspond to a same communication event, as described above. For instance, the resolution policy 312 may specify a minimum number of data items that must be similar to determine that an entry and a communication notification correspond to a same communication event. Additionally, in some examples, the resolution policy 312 may specify one or more data items that must be similar in order to determine that an entry and a communication notification correspond to a same communication event. In at least one example, the resolution module 310 may determine whether the resolution policy 312 is satisfied. If the resolution policy 312 is not satisfied, the resolution module 310 may access another data item associated with the communication notification and another data item associated with the entry and proceed through blocks 606-614 until the resolution module 310 determines that the resolution policy 312 is satisfied.

Block 616 illustrates determining that the communication notification and the entry correspond to a same communication event. Based at least in part on determining that the resolution policy 312 is satisfied, the resolution module 310 may determine that the communication notification and the entry correspond to a same communication event.

Block 618 illustrates refraining from adding a new entry to the local activity database. Based at least in part on determining that the communication notification and the entry correspond to a same communication event, the resolution module 310 may determine that the communication notification is a duplicate of the communication event associated with the entry. As such, the database management module 314 may disregard the communication notification and may refrain from adding a new entry to the local activity database 318.

Block 620 illustrates determining that the communication notification is associated with a new communication event. Based at least in part on determining that the first data item and the second data item are not similar, the resolution module 310 may determine that the communication notification is associated with a new communication event. That is, the resolution module 310 may determine that none of the entries associated with the local activity database 318 correspond to the communication event associated with the communication notification.

Block 622 illustrates adding a new entry to the local activity database associated with the new communication event. Based at least in part on determining that the communication notification is associated with a new communication event, a database management module 314 associated with the related device may add a new entry to the local activity database 318 corresponding to the new communication event.

Figure 7:
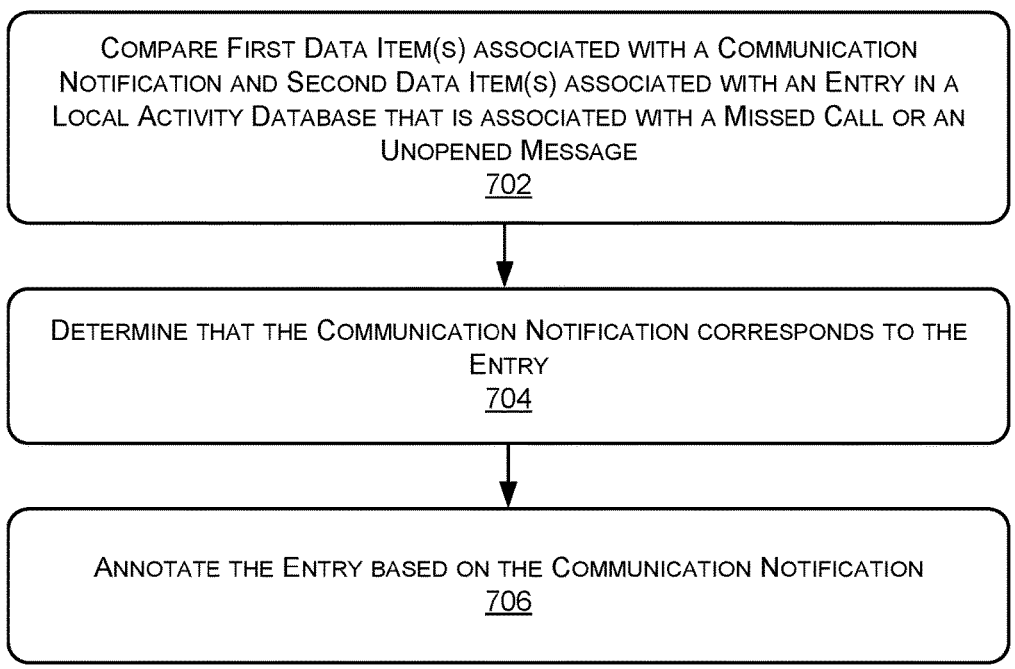
FIG. 7 illustrates an example process for determining that a communication notification corresponds to an entry in a local activity database.

FIG. 7 illustrates an example process 700 for determining that a communication notification corresponds to an entry in a local activity database.

Block 702 illustrates comparing first data item(s) associated with a communication notification and second data item(s) associated with an entry in a local activity database 318 associated with a related device that is associated with a missed call or an unopened message.

As described above, an external device may send a communication (e.g., make a call, send a message, etc.) to an account or a line associated with a group of related devices. In at least one example, a related device of the group of related devices may interact with the communication from the external device. Database management module(s) 314 associated with the related device(s) that did not interact with the communication may add an entry to corresponding local activity database(s) (e.g., local activity database 318). In at least one example, the entry may correspond to a missed call, an unopened message, etc., and the entry may include data items associated with the communication event, as described above. In some examples, the entry may include an additional indicator that the communication corresponding to the communication event was not interacted with (e.g., missed or unopened).

In at least one example, resolution module(s) 310 associated with related devices that did not interact with a communication (e.g., did not answer a call, did not open a message, etc.) may compare first data items associated with a communication notification with second data items associated with entries in corresponding local activity databases, as described above with reference to blocks 602-612 of FIG. 6.

Block 704 illustrates determining that the communication notification corresponds to the entry. In at least one example, the resolution module 310 associated with the related device may determine whether the communication notification corresponds to an entry in the local activity database 318. As described above with reference to block 614 of FIG. 6, based at least in part on determining that at least one first data item and at least one second data item are similar, the resolution module 310 may determine whether a resolution policy 312 is satisfied. In at least one example, the resolution module 310 may be associated with a resolution policy 312 that may identify one or more requirements for determining that an entry and a communication notification correspond to a same communication event, as described above. If the resolution policy 312 is not satisfied, the resolution module 310 may access another data item associated with the communication notification and another data item associated with the entry and proceed through blocks 606-614 described above with reference to FIG. 6 until the resolution module 310 determines that the resolution policy 312 is satisfied. Based at least in part on determining that the resolution policy 312 is satisfied, the resolution module 310 may determine that the communication notification corresponds to the entry that is associated with a missed call or an unopened message.

Block 706 illustrates annotating the entry based on the communication notification. In at least one example, based at least in part on the communication notification, the resolution module 310 may determine that the communication was interacted with by another related device (e.g., another related device answered the call or opened the message). Additionally, the resolution module 310 may determine which related device interacted with the communication based on at least one first data item associated with the communication notification. In at least one example, the database management module 314 may update the entry corresponding to the communication event to indicate that the communication was interacted with by another related device and/or which of the related devices interacted with the communication. That is, the database management module 314 may annotate the entry based on the communication notification. Additional details associated with the communication event may also be added to the entry.

Figure 8:
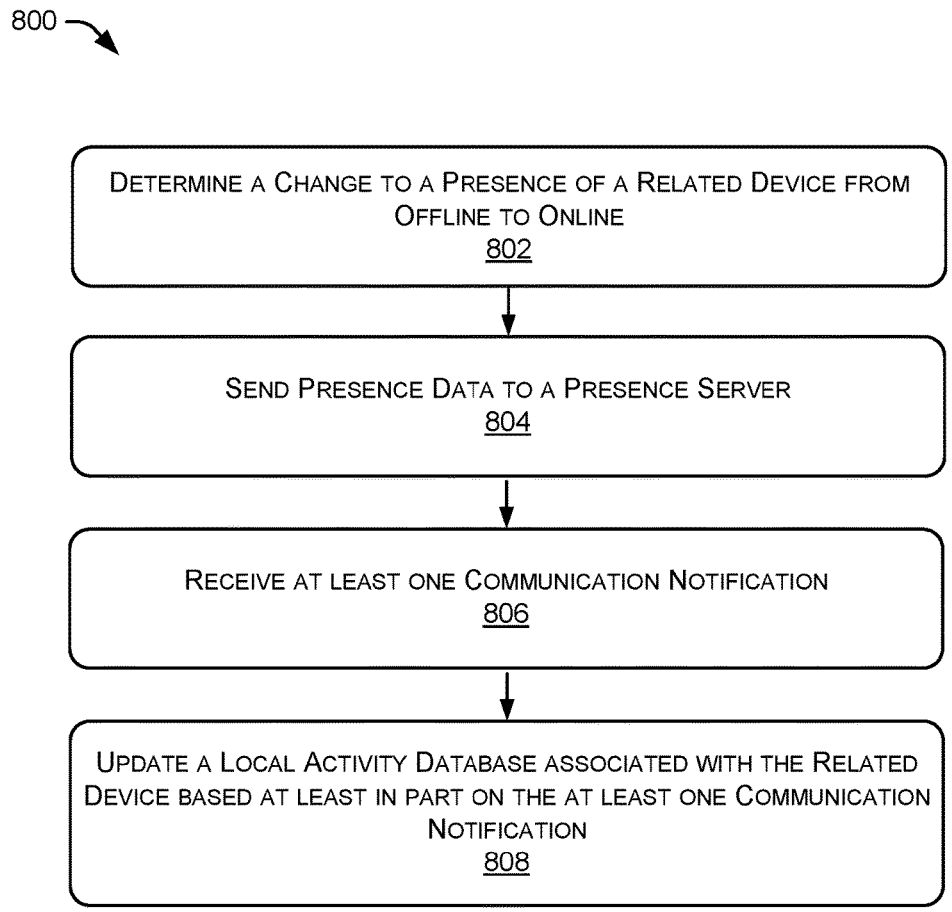
FIG. 8 illustrates an example process for updating a local activity database based on a change to a presence of a related device.

FIG. 8 illustrates an example process 800 for updating a local activity database based on a change to a presence of a related device.

Block 802 illustrates determining a change to a presence of a related device from offline to online. In at least one example, presence information obtained from the presence server 220 may be utilized to identify related devices that are currently online. In at least one example, a related device may be offline for a period of time and an interaction with the related device may change the presence of the related device from offline to online.

Block 804 illustrates sending presence data to a presence server to indicate that the related device is online and/or capable of receiving communication notifications. As described above, in some examples, the related devices may be configured to provide their presence information to the presence server 220. Additionally and/or alternatively, the related devices may be configured to provide capabilities information to the presence server 220. The capabilities information may indicate an ability to receive calls, receive messages, receive shared content, receive shared video conversations, receive communication notifications, and so forth. In at least one example, the related device may send presence data to the presence server 220 to indicate that the related device is online and/or capable of receiving communication notifications Block 806 illustrates receiving at least one communication notification. In at least one example, based at least in part on the related device changing its presence from offline to online, the database management module 414 may send the related device one or more communication notifications associated with communication events that occurred with one or more other related devices while the related device was offline.

Block 808 illustrates updating a local activity database associated with the related device based at least in part on the at least one communication notification. Based at least in part on receiving the at least one communication notification associated with at least one communication event that occurred with one or more other related devices while the related device was offline, the database management module 314 may add new entry(s) associated with the at least one communication notification to the local activity database 318. As a result, the related device that was previously offline and/or not capable of receiving communication notifications associated with communication events may synchronize an associated local activity database 318 with communication events when the related device returns online and/or becomes capable of receiving communication notifications associated with communication events.

The processes described above in association with FIGS. 5-8 can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. In other embodiments, hardware components perform one or more of the operations. Such hardware components may include or be incorporated into processors, application-specific integrated circuits (ASICs), programmable circuits such as field programmable gate arrays (FPGAs), or in other ways. The order in which the operations are described is not intended to be construed as a limitation, and any number of the described operations can be combined in any order and/or in parallel to implement the processes.

Although the subject matter has been described in language specific to structural data items and/or methodological acts, it is to be understood that the subject matter defined in the appended claims is not necessarily limited to the specific data items or acts described. Rather, the specific data items and acts are disclosed as exemplary forms of implementing the claims.

What is claimed is:
1. A method comprising:
receiving, by a related device of a group of related devices, a communication notification representative of a first communication event, the group of related devices being related based on at least one of utilizing a same communication address for sending and receiving at least communications via a network or being associated with a same subscriber account associated with a telecommunications service provider, the first communication event originating at an originating device and being addressed to the same communication address or the same subscriber account;

accessing, by the related device and from a local activity database associated with the related device, an entry corresponding to a second communication event associated with the related device;

accessing, by the related device, a first data item associated with the communication notification, the first data item being associated with first content associated with the first communication event;

accessing, by the related device, a second data item associated with the entry, the second data item being associated with second content associated with the second communication event;

comparing, by the related device, the first data item and the second data item;

determining, by the related device and based at least in part on comparing the first data item and the second data item, that the first data item is similar to the second data item based at least in part on:

processing the first content and the second content based at least in part on performing semantic analysis or image recognition analysis on the first content and the second content; and determining, based at least in part on results of the semantic analysis or the image recognition analysis, that an extent to which the first content differs from the second content is less than a threshold;

determining, by the related device and based at least in part on the first data item being similar to the second data item, that the communication notification and the entry correspond to a same communication event; and refraining, by the related device, from adding the communication notification to the local activity database.

2. The method of claim 1, wherein the same communication event is an incoming call answered by the related device.

3. The method of claim 1, wherein the originating device is the related device and the same communication event is an outgoing call from the related device.

4. The method of claim 1, wherein the same communication event is an incoming message opened by the related device.

5. The method of claim 1, wherein the originating device is the related device and the same communication event is an outgoing message sent from the related device.

6. The method of claim 1, wherein:

the first data item corresponds to at least one of first communication addresses or first subscriber accounts associated with first participants in the first communication event;

the second data item corresponds to at least one of second communication addresses or second subscriber accounts associated with second participants in the second communication event; and determining that the first data item is similar to the second data item is based at least in part on determining that at least one of the first communication addresses and the second communication addresses or the first subscriber accounts and the second subscriber accounts match.

7. The method of claim 1, wherein the first data item and the second data item are associated with a start time of a call, an end time of the call, or a duration of the call.

8. The method of claim 1, wherein the first data item and the second data item are associated with a send time of a message, a received time of the message, or a read time of the message.

9. The method of claim 1, wherein:

the first data item is associated with a first timestamp associated with the first communication event;

the second data item is associated with a second timestamp associated with the second communication event; and determining that the first data item is similar to the second data item is based at least in part on:

determining an amount of time between the first timestamp and the second timestamp; and determining that the amount of time is less than a threshold amount of time.

10. The method of claim 1, wherein:

the first data item is associated with a first identifier of the first communication event;

the second data item is associated with a second identifier of the second communication event; and determining that the first data item is similar to the second data item is based at least in part on determining that the first identifier matches the second identifier.

11. A mobile device comprising:

an activity database storing a plurality of entries corresponding to first communication events associated with a group of related devices that at least one of utilize a same communication address as the mobile device for sending and receiving at least communications via a network or are associated with a same subscriber account as the mobile device, the same subscriber account being associated with a telecommunications service provider;

one or more processors;

memory; and a plurality of programming instructions stored on the memory and executable by the one or more processors to perform operations comprising:

receiving a communication notification representative of at least one second communication event associated with at least one related device of the group of related devices;

accessing first data items associated with individual entries of the entries that are stored in the activity database, the first data items being associated with the first communication events;

comparing the first data items with second data items associated with the communication notification, the second data items being associated with the at least one second communication event, where comparing the first data items with the second data items comprises:

processing the first data items with the second data items based at least in part on performing semantic analysis or image recognition analysis on at least one of the first data items and at least one of the second data items; and determining, based at least in part on results of the semantic analysis or the image recognition analysis, whether an extent to which the first data items differ from the second data items is less than a threshold; and based at least in part on comparing the first data items with the second data items, determining whether the communication notification corresponds to any of the entries.

12. The mobile device of claim 11, wherein:

a first data item of the first data items corresponds to at least one of first communication addresses or first subscriber accounts associated with first participants of the first communication event;

a first data item of the second data items corresponds to at least one of second communication addresses or second subscriber accounts associated with second participants of the at least one second communication event; and the operations further comprise determining that at least one of the first communication addresses and the second communication addresses or the first subscriber accounts and the second subscriber accounts match.

13. The mobile device of claim 12, wherein comparing the first data items with the second data items comprises:

comparing a second data item of the first data items with a second data item of the second data items, the second data item of the first data items corresponding to the second data item of the second data items;

determining that the second data item of the first data items is similar to the second data item of the second data items, the second data item of the first data items being similar to the second data item of the second data items based at least in part on (i) the second data item of the first data items matching the second data item of the second data items or (ii) the second data item of the first data items differing from the second data item of the second data items by an extent that is less than the threshold; and refraining from adding the communication notification to the activity database.

14. The mobile device of claim 11, further comprising:

determining that the communication notification does not correspond to any of the entries; and adding a new entry to the activity database, the new entry corresponding to the at least one second communication event.

15. The mobile device of claim 14, further comprising:

determining a change to a presence of the mobile device from offline to online;

sending presence data to a presence server to indicate that the mobile device is online and capable of receiving communication notifications, the presence server being associated with the one or more server computing devices; and receiving the communication notification responsive to sending the presence data to the presence server.

16. The mobile device of claim 15, further comprising receiving additional communication notifications representative of third communication events associated with the group of related devices that occurred while the mobile device was offline.

17. The mobile device of claim 11, the operations further comprising:

determining a third communication event prior to receiving the communication notification, the third communication event corresponding to a call that was missed by the mobile device or a message that was not opened by the mobile device;

adding an entry of the entries to the activity database, the entry corresponding to the third communication event and including an indication that the third communication event was missed or not opened;

determining that the at least one second communication event corresponds to the third communication event;

determining, based at least in part on a third data item associated with the communication notification, which related device of the group of related devices answered the call or opened the message; and updating the entry to indicate that the other related device answered the call or opened the message.

18. The mobile device of claim 11, wherein the second communication event originates from an originating device and is addressed to the same communication address or the same subscriber account, and the second communication event is received, by the at least one related device and one or more other related devices of the group of related devices, at a substantially same time.

19. The mobile device of claim 11, wherein comparing the first data items with second data items associated with the communication notification comprises determining that the extent is less than the threshold, wherein determining whether the communication notification corresponds to any of the entries comprises determining that the communication notification corresponds to at least one of the entries, and wherein the operations further comprise refraining from adding the communication notification to the activity database.

20. A system comprising:

one or more processors;

memory; and a plurality of programming instructions stored on the memory and executable by the one or more processors to perform operations comprising:

determining a first communication event associated with at least one related device of a group of related devices, the first communication event originating from an originating device and being intended for the group of related devices having with the same communication address or being associated with the same subscriber account, the first communication event being associated with first content;

accessing an activity database storing an existing entry corresponding to a second communication event associated with the group of related devices, the second communication event being associated with second content;

determining the first communication event is different from the second communication event:

processing the first content with second content based at least in part on performing semantic analysis or image recognition analysis on the first content and the second content; and determining, based at least in part on results of the semantic analysis or the image recognition analysis, an extent to which the first content differs from the second content is not less than a threshold; and causing a new entry corresponding to the first communication event to be added to the activity database.

* * * * *